(12) United States Patent
Ferguson et al.

(10) Patent No.: US 10,256,659 B2
(45) Date of Patent: Apr. 9, 2019

(54) INDUCTIVE CHARGING FOR A VEHICLE

(71) Applicant: Carrier Corporation, Jupiter, FL (US)

(72) Inventors: Benjamin Edward Ferguson, Cazenovia, NY (US); Robert A. Chopko, Baldwinsville, NY (US)

(73) Assignee: CARRIER CORPORATION, Farmington, CT (US)

( * ) Notice: Subject to any disclaimer, the term of this patent is extended or adjusted under 35 U.S.C. 154(b) by 166 days.

(21) Appl. No.: 15/275,609

(22) Filed: Sep. 26, 2016

(65) Prior Publication Data

US 2017/0098954 A1     Apr. 6, 2017

Related U.S. Application Data

(60) Provisional application No. 62/236,627, filed on Oct. 2, 2015.

(51) Int. Cl.
*H02J 7/00* (2006.01)
*B60L 11/00* (2006.01)
(Continued)

(52) U.S. Cl.
CPC ............ *H02J 7/025* (2013.01); *B60D 1/62* (2013.01); *B60L 11/182* (2013.01);
(Continued)

(58) Field of Classification Search
CPC ........... H02J 7/025; B60D 1/62; B60L 11/182
(Continued)

(56) References Cited

U.S. PATENT DOCUMENTS 3,701,547 A * 10/1972 Goold ............... B62D 53/0878
280/432
5,594,318 A    1/1997 Nor et al.
(Continued)

FOREIGN PATENT DOCUMENTS

DE    102010021705    1/2011
DE    102010021706    1/2011
(Continued)

OTHER PUBLICATIONS

"DENSO to test wireless charging system using refrigerated truck", Green Car Congress, Feb. 20, 2014; 2 pages.
(Continued)

*Primary Examiner* — Stacy Whitmore
(74) *Attorney, Agent, or Firm* — Cantor Colburn LLP

(57) ABSTRACT

A vehicle having a wireless power system is provided. The vehicle includes a tractor and a trailer mounted to the tractor, the tractor having a tractor frame and the trailer having a refrigeration unit. A first inductive charging pad is mounted on the trailer, the first inductive charging pad electrically connected to a portion of the refrigeration unit. A second inductive charging pad is mounted on the tractor, the second inductive charging pad electrically connected to a portion of the tractor and configured to induce an electrical current in the first inductive charging pad. The first inductive charging pad and the second inductive charging pad are configured such that the second charging pad can induce and maintain the electric current in the first inductive charging pad throughout a range of relative rotation.

16 Claims, 6 Drawing Sheets

(51) Int. Cl.
*B60D 1/00* (2006.01)
*H02J 7/02* (2016.01)
*B60L 11/18* (2006.01)
*B60D 1/62* (2006.01)

(52) U.S. Cl.
CPC ....... *B60L 2200/28* (2013.01); *B60L 2200/36* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ................................................. 320/104, 108
See application file for complete search history.

(56) References Cited

U.S. PATENT DOCUMENTS

| | | | |
|---|---|---|---|
| 9,425,654 B2* | 8/2016 | Lenius | H02J 17/00 |
| 2002/0047491 A1* | 4/2002 | Hirose | H02N 1/008 |
| | | | 310/309 |
| 2009/0029014 A1 | 1/2009 | Walter et al. | |
| 2011/0084658 A1 | 4/2011 | Yamamoto et al. | |
| 2013/0037339 A1 | 2/2013 | Hickox | |
| 2013/0154553 A1 | 6/2013 | Steele | |
| 2014/0015327 A1 | 1/2014 | Keeling et al. | |
| 2014/0015329 A1 | 1/2014 | Widmer et al. | |
| 2014/0132208 A1 | 5/2014 | Fisher | |
| 2014/0152252 A1* | 6/2014 | Wood | H02J 50/10 |
| | | | 320/108 |
| 2014/0265555 A1* | 9/2014 | Hall | B60L 1/00 |
| | | | 307/9.1 |
| 2014/0300182 A1 | 10/2014 | James | |
| 2015/0015193 A1 | 1/2015 | Oman et al. | |
| 2015/0253058 A1 | 9/2015 | Casasanta | |

FOREIGN PATENT DOCUMENTS

| | | |
|---|---|---|
| DE | 102010041454 | 3/2012 |
| FR | 2911862 | 8/2008 |
| GB | 2512406 | 10/2014 |
| WO | 2015077239 | 5/2015 |

OTHER PUBLICATIONS

Boer, et al. "Zero emissions trucks, An overview of state-of-the-art technologies and their potential", CE Delft, Jul. 2013; 151 pages.

Maggetto, et al. "Inductive Automatic Charging: The Way to Safe, Efficient and User-Friendly Electric Vehicle Infrastructure", Aug. 7, 2003; 12 pages.

European Search Report, European Application No. 16191602.8, dated Feb. 16, 2017, European Patent Office; European Search Report 8 pages.

* cited by examiner

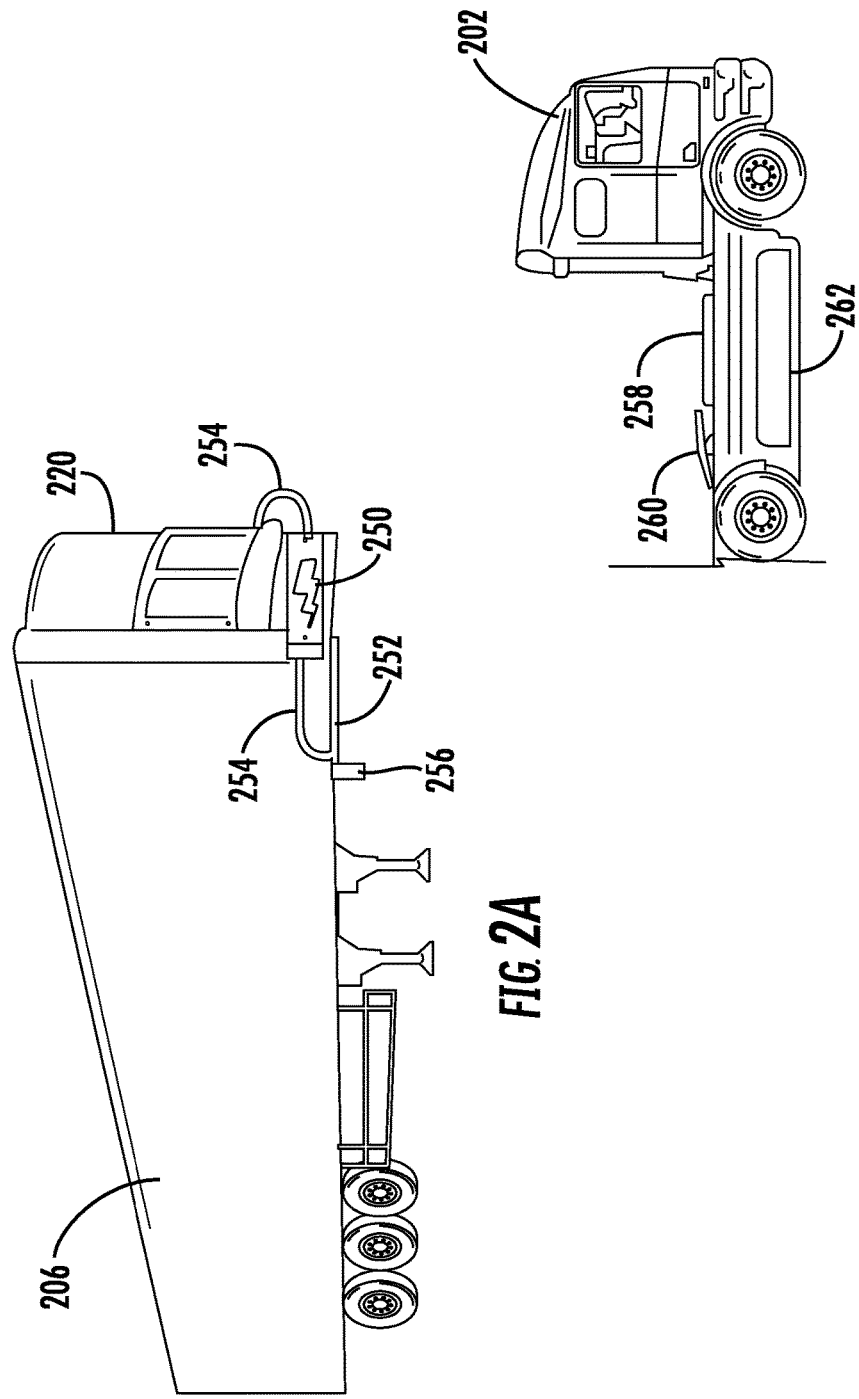

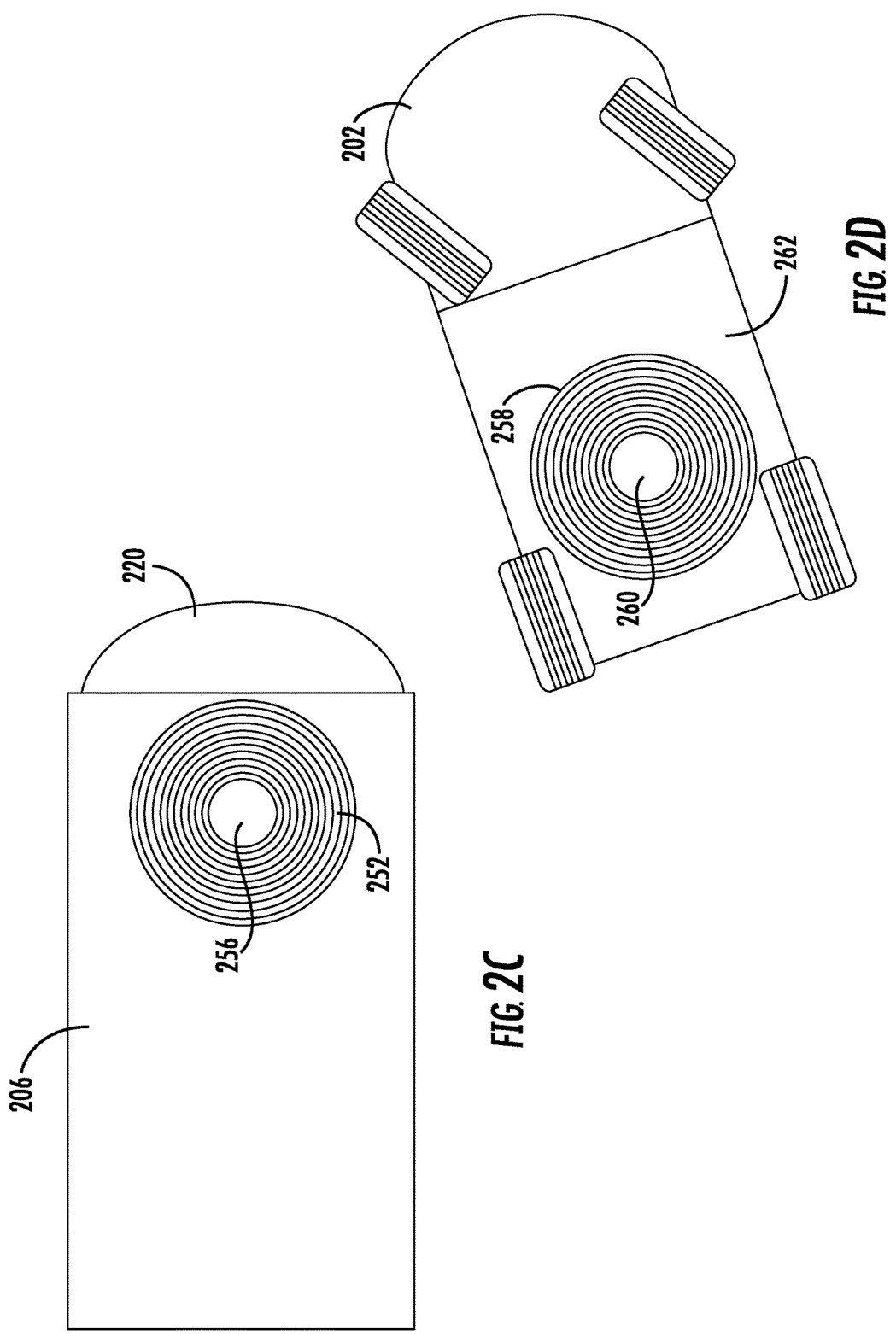

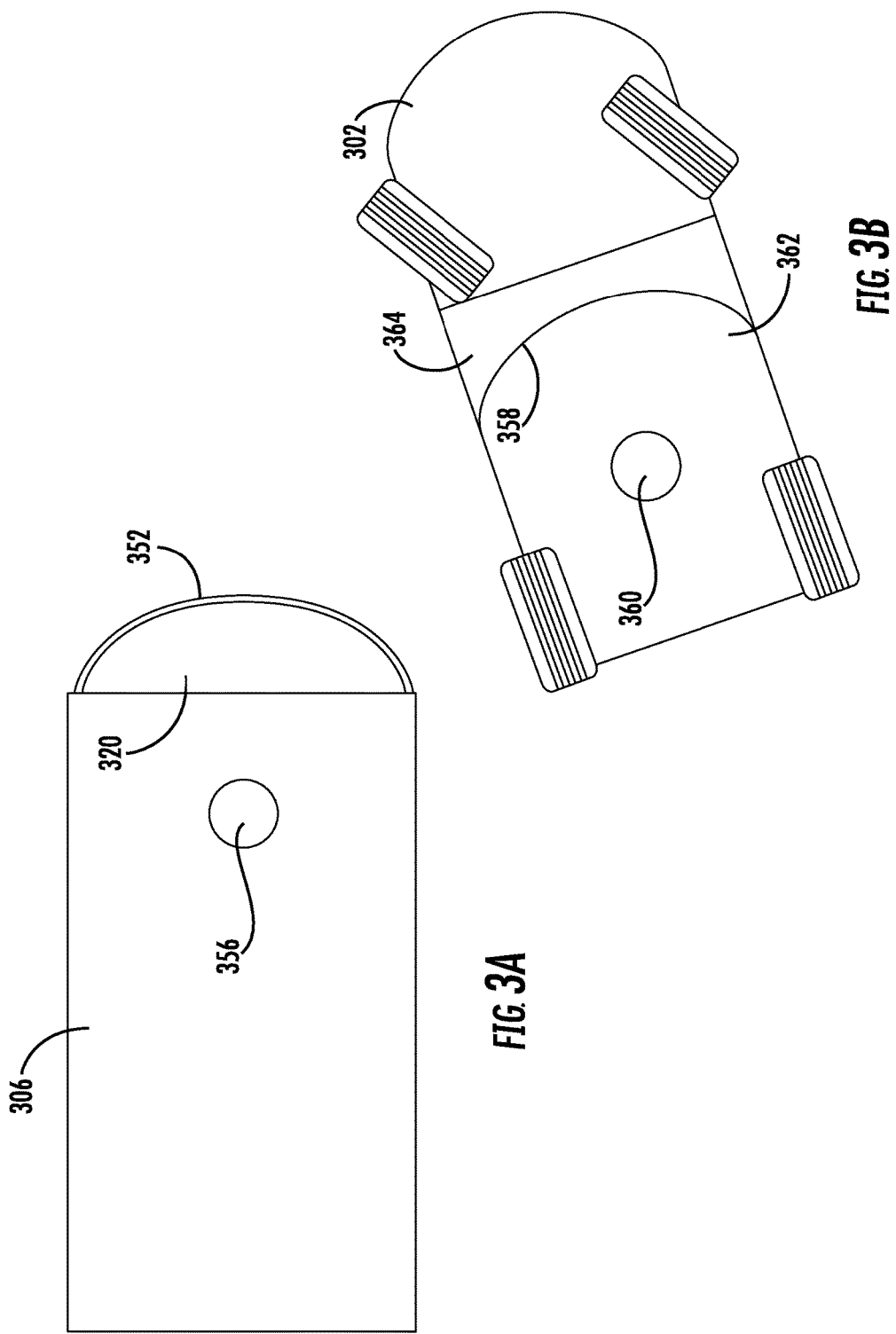

INDUCTIVE CHARGING FOR A VEHICLE

CROSS-REFERENCE TO RELATED APPLICATIONS

This application claims the benefit of U.S. Provisional Application Ser. No. 62/236,627, entitled "Inductive Charging for a Vehicle" filed Oct. 2, 2015, under 35 U.S.C. § 119(e), and which is incorporated herein by reference in its entirety.

BACKGROUND

The subject matter disclosed herein generally relates to refrigeration units on vehicles and, more particularly, to inductive charging for refrigeration units on vehicles.

A typical refrigerated cargo truck or refrigerated tractor trailer, such as those utilized to transport a cargo via sea, rail, or road, is a truck or trailer having a cargo compartment modified to include a refrigeration unit located at one end of the truck or trailer. Refrigeration units typically include a compressor, a condenser, an expansion valve, and an evaporator serially connected by refrigerant lines in a closed refrigerant circuit in accord with known refrigerant vapor compression cycles. A power unit, such as an engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine drives a generator that generates electrical power, which in turn drives the compressor.

Manufacturers and operators of fleets of refrigerated trucks and refrigerated tractor trailer desire to maximize operational efficiency of not only the refrigeration unit, but of the truck or tractor trailer system as a whole. One area of improvement may be made with respect to the evaporator fans of the refrigeration systems. Evaporator fans are used during the refrigeration process to maintain appropriate air temperatures within the refrigerated tractor trailer. The evaporator fans are electrically powered devices that require appropriate cabling and wiring for suitable operation.

SUMMARY

According to one embodiment, a vehicle having a wireless power system is provided. The vehicle includes a tractor and a trailer mounted to the tractor, the trailer having a refrigeration unit. A first inductive charging pad is mounted on the trailer, the first inductive charging pad electrically connected to a portion of the refrigeration unit. A second inductive charging pad is mounted on the tractor, the second inductive charging pad electrically connected to a portion of the tractor and configured to induce an electrical current in the first inductive charging pad. The first inductive charging pad and the second inductive charging pad are configured such that during relative rotation between the trailer and the tractor, the second charging pad can induce and maintain the electric current in the first inductive charging pad throughout a range of the relative rotation.

In addition to one or more of the features described above, or as an alternative, further embodiments of the vehicle may include that the first inductive charging pad is mounted on a bottom side of the trailer and the second inductive charging pad is mounted on a frame of the tractor.

In addition to one or more of the features described above, or as an alternative, further embodiments of the vehicle may include that the first inductive charging pad is configured about a king pin on the trailer and the second inductive charging pad is configured about a shoe located on the frame of the tractor.

In addition to one or more of the features described above, or as an alternative, further embodiments of the vehicle may include that the first inductive charging pad is mounted on a frame of the refrigeration unit and the second inductive charging pad is mounted to a cab of the tractor.

In addition to one or more of the features described above, or as an alternative, further embodiments of the vehicle may include a generator located on the tractor, the generator configured to supply an electrical current to the second inductive charging pad.

In addition to one or more of the features described above, or as an alternative, further embodiments of the vehicle may include a regenerative braking system, the regenerative braking system configured to supply an electrical current to the second inductive charging pad.

In addition to one or more of the features described above, or as an alternative, further embodiments of the vehicle may include a battery on the trailer, wherein the electrical current induced in the first inductive charging pad is employed to charge the battery.

In addition to one or more of the features described above, or as an alternative, further embodiments of the vehicle may include that the electrical current induced in the first inductive charging pad is employed to run the refrigeration unit.

In addition to one or more of the features described above, or as an alternative, further embodiments of the vehicle may include that the electrical current induced in the first inductive charging pad is employed to run the refrigeration unit.

In addition to one or more of the features described above, or as an alternative, further embodiments of the vehicle may include that at least one of the first inductive charging pad and the second inductive charging pad is circular.

According to another embodiment, a method of wirelessly transferring power on a vehicle includes generating an electrical current on a tractor of the vehicle, supplying the electrical current to an inductive charging pad on the tractor, inducing an electrical current in an inductive charging pad on a trailer of the vehicle, supplying the induced electrical current to a portion of a refrigeration unit on the trailer, and maintaining the induced electrical current in the inductive charging pad on the trailer during relative rotation between the trailer and the tractor.

In addition to one or more of the features described above, or as an alternative, further embodiments of the method may include that the inductive charging pad on the trailer is mounted on a bottom side of the trailer and the inductive charging pad on the tractor is mounted on a frame of the tractor.

In addition to one or more of the features described above, or as an alternative, further embodiments of the method may include that the inductive charging pad on the trailer is configured about a king pin on the trailer and the inductive charging pad on the tractor is configured about a shoe of the tractor.

In addition to one or more of the features described above, or as an alternative, further embodiments of the method may include that the inductive charging pad on the trailer is mounted on a frame of the refrigeration unit and the inductive charging pad on the tractor is mounted to a cab of the tractor.

In addition to one or more of the features described above, or as an alternative, further embodiments of the method may include that generating the electrical current on the tractor comprises regenerative braking of the vehicle.

In addition to one or more of the features described above, or as an alternative, further embodiments of the method may include that the portion of the refrigeration unit that is supplied with the electrical current is a battery.

In addition to one or more of the features described above, or as an alternative, further embodiments of the method may include that the portion of the refrigeration unit that is supplied with the electrical current is a component of the refrigeration unit to be directly operated with the electrical current.

Technical effects of embodiments of the present disclosure include a vehicle having wireless power transfer between a tractor and a trailer of a tractor trailer vehicle. Further technical effects include charging a battery of a refrigeration unit on a trailer with power supplied wirelessly from the tractor. Further technical effects include operating a refrigeration unit on the trailer with power supplied wireless from the tractor. Further technical effects include enabling continuous power transfer or induction from the tractor to the trailer even during relative rotation between the tractor and the trailer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A is a schematic perspective illustration of a trailer in accordance with an embodiment of the present disclosure;

FIG. 2B is a schematic side illustration of a tractor in accordance with an embodiment of the present disclosure, the tractor connectable to the trailer of FIG. 2A;

FIG. 2C is a bottom-up schematic illustration of the trailer of FIG. 2A;

FIG. 2D is a top-down schematic illustration of the tractor of FIG. 2B;

FIG. 3A is a bottom-up schematic illustration of a trailer in accordance with another embodiment of the present disclosure;

FIG. 3B is a top-down schematic illustration of a tractor in accordance with another embodiment of the present disclosure, the tractor connectable to the trailer of FIG. 3A.

DETAILED DESCRIPTION

Figure 1A:
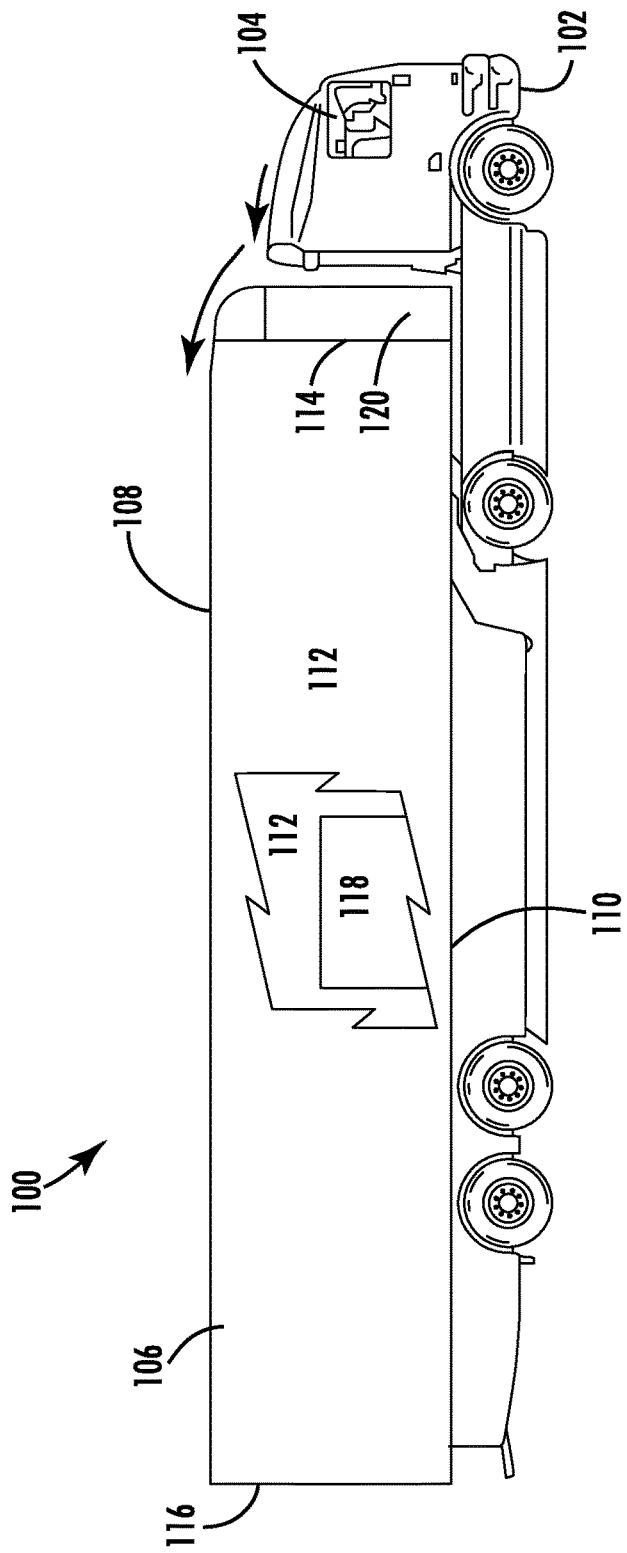
FIG. 1A is a schematic view of an exemplary embodiment of a system having a refrigeration unit and a cargo compartment.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Shown in FIG. 1A is a schematic illustration of an embodiment of a tractor trailer system 100. The tractor trailer system 100 includes a tractor 102 including an operator's compartment or cab 104 and also including an engine, which acts as the drive system of the tractor trailer system 100. A trailer 106 is coupled to the tractor 102. The trailer 106 is a refrigerated trailer and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a refrigeration unit 120 located on or next to the trailer 106. The refrigeration unit 120, as shown in FIG. 1A, is located at or attached to the front wall 114.

Figure 1B:
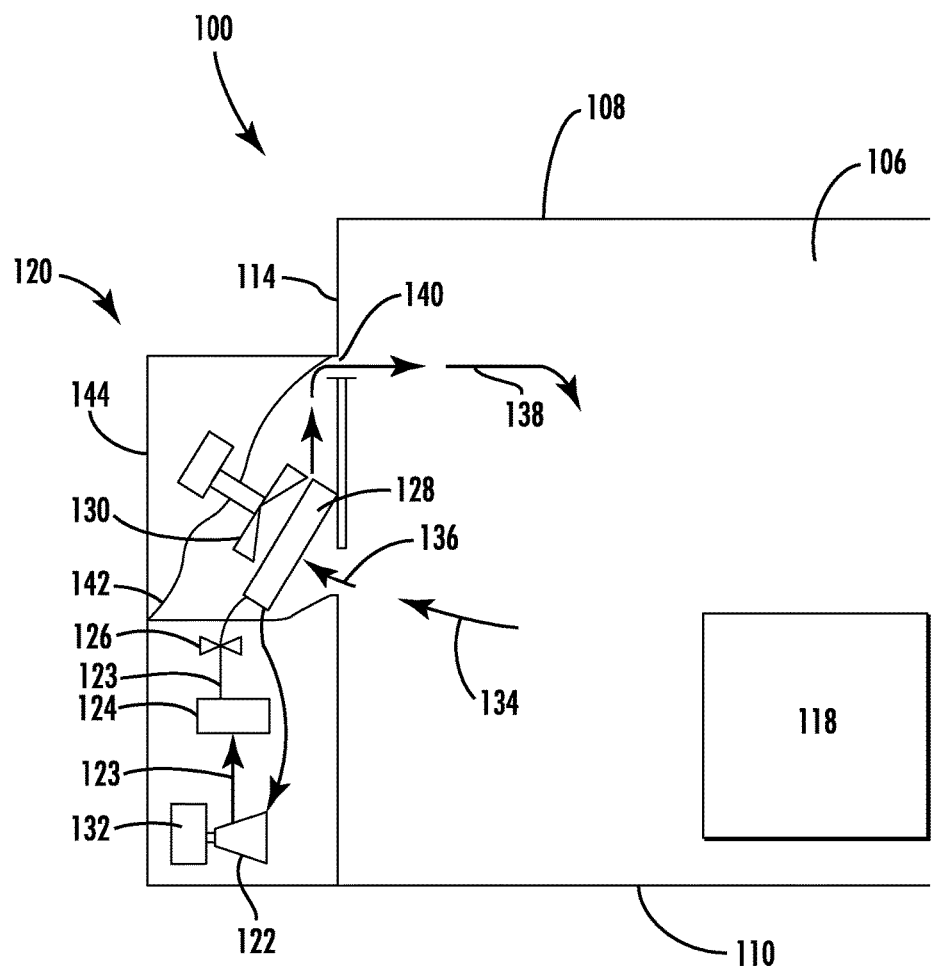
FIG. 1B is a schematic view of an exemplary embodiment of a refrigeration unit for a cargo compartment of the tractor trailer system of FIG. 1A.

Referring now to FIG. 1B, the refrigeration unit 120 is shown in more detail. The refrigeration unit 120 includes a compressor 122, a condenser 124, an expansion valve 126, an evaporator 128, and an evaporator fan 130. The compressor 122 is operably connected to a refrigeration engine 132 which drives the compressor 122. The refrigeration engine 132 is connected to the compressor in one of several ways, such as a direct shaft drive, a belt drive, one or more clutches, and/or via an electrical generator. A refrigerant line 123 fluidly connects the components of the refrigeration unit 120. The refrigeration engine 132 may be powered by power supplied from the engine of the tractor 102, from a separate drive engine, from grid power, or from a battery, for example.

Airflow is circulated into and through the cargo compartment of the trailer 106 by means of the refrigeration unit 120. A return airflow 134 flows into the refrigeration unit 120 from the cargo compartment of the trailer 106 through a refrigeration unit inlet 136, and across the evaporator 128 via the evaporator fan 130, thus cooling the return airflow 134 to a selected or predetermined temperature. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106. It is to be appreciated that the refrigeration unit 120 can further be operated in reverse to warm the trailer 106 when, for example, the outside temperature is very low.

The refrigeration unit 120 is positioned in a refrigeration frame 142 and contained in an accessible housing 144, with the refrigeration frame 142 and/or the housing 144 secured to an exterior side of the front wall 114 such that the refrigeration unit 120 is positioned between the front wall 114 and the tractor 102, as shown in FIG. 1A.

It will be appreciated by those of skill in the art that the systems and configurations of FIGS. 1A and 1B are provided for illustrative and descriptive purposes only. The present disclosure is not limited thereby. For example, although a tractor trailer configuration is shown, systems may be employed in other trailer configurations, in various truck configurations, and/or in other systems and configurations.

Turning now to FIGS. 2A-2D, an example embodiment in accordance with the present disclosure is shown. In FIGS. 2A and 2C a trailer 206 is provided with a refrigeration unit 220 attached thereto, in a configuration similar to that shown in FIG. 1A. FIG. 2A is a perspective view of the trailer 206 and FIG. 2C is a bottom-up view of the trailer 206. FIGS. 2B and 2D show a tractor 202 that may be similar to the tractor shown in FIG. 1A. FIG. 2B is a side view of the tractor 202 and FIG. 2D is a top-down view of the tractor 202.

The refrigeration unit 220 may be a hybrid refrigeration unit that may be powered, at least in part, by a battery 250. The battery 250 may be electrically connected to the refrigeration unit 220 and to a first inductive charging pad 252 by electrical wiring 254. The first inductive charging pad 252 may be located proximal to or around a king pin 256 of the trailer 206. The king pin 256 may operably connect the trailer 206 to the tractor 202.

The tractor 202 may include a second inductive charging pad 258 that is located proximal to or concentric around a shoe 260 on a tractor frame 262 of the tractor 202. The shoe 260 is configured to receive the king pin 256 of the trailer 206 and enable a secure engagement between the tractor 202 and the trailer 206. In some embodiments, the second inductive charging pad 258 may be electrically connected to a belt driven generator on the tractor 202.

Each of the first inductive charging pad 252 and the second inductive charging pad 258 may be configured as large area inductive charging pads. Further, as shown in FIGS. 2C and 2D, the first inductive charging pad 252 and the second inductive charging pad 258 may be configured as matching or substantially the same shape circles. This configuration, when employed, enables power to be constantly supplied from the tractor 202 to the trailer 206 even when the tractor 202 is turning and rotated relative to the trailer 206. That is, the first and second inductive charging pads 252, 258 are configured such that relative motion between the tractor 202 and the trailer 206 does not impact the ability to transfer power from the tractor 202 to the trailer 206.

Although shown as concentric circles, those of skill in the art will appreciate that other shapes, geometries, and/or configurations may be employed for either or both of the first and second inductive charging pads. For example, rather than complete circles, one or both of the inductive charging pads may be configured as arcuate shapes that do not extend a full circle. Further, in some embodiments, the inductive charging pads may be rectangular and/or square and arranged in a circular fashion. As will be appreciated, various configurations are possible while maintaining an inductive connection or communication between the first and second inductive charging pads.

Turning now to FIGS. 3A and 3B, an alternative embodiment in accordance with the present disclosure is shown. As shown, a trailer 306 includes a refrigeration unit 320 with a first inductive charging pad 352 mounted on an exterior of the refrigeration unit 320. For example, as described with respect to FIG. 1B, the refrigeration unit 320 may include a refrigeration frame and/or a housing, and the first inductive charging pad 352 may be mounted thereto. As shown, the first inductive charging pad 352 may be arcuate shaped.

Similarly, the tractor 302 may be configured with a second inductive charging pad 358. The second inductive charging pad 358 may be mounted on a support frame 364. The support frame 364 may be mounted to a part of the cab of the tractor 302 and/or to the tractor frame 362. As shown, the support frame 364 may be arcuate in shape such that the second inductive charging pad 358 may have a shape similar to the shape of the first inductive charging pad 352. Thus, when the tractor 302 rotates relative to the trailer 306 about the king pin 356 and shoe 360, the induction charging between the two inductive charging pads may be maintained.

In any of the above embodiments or alternatives thereof, a generator or engine on the tractor may be used to supply electrical power to the second inductive charging pad. Inductive charging (also known as "wireless charging") uses an electromagnetic field to transfer energy between two objects, i.e., between the two inductive charging pads. Energy is sent through an inductive coupling to an electrical device, which can then use that energy to charge batteries or run the device. That is, the inductive coupling may be used to charge batteries for the refrigeration unit and/or the inductive coupling may be configured to run the refrigeration unit directly.

The second inductive charging pad may be configured as an induction coil and when electrical power is supplied thereto the second inductive charging pad generates an alternating electromagnetic field. The first inductive charging pad, which may be configured as an induction coil, takes power from the electromagnetic field and converts it back into electric current to charge the battery or operate the refrigeration unit. The two inductive charging pads as configured combine to form an electrical transformer.

Figure 4:
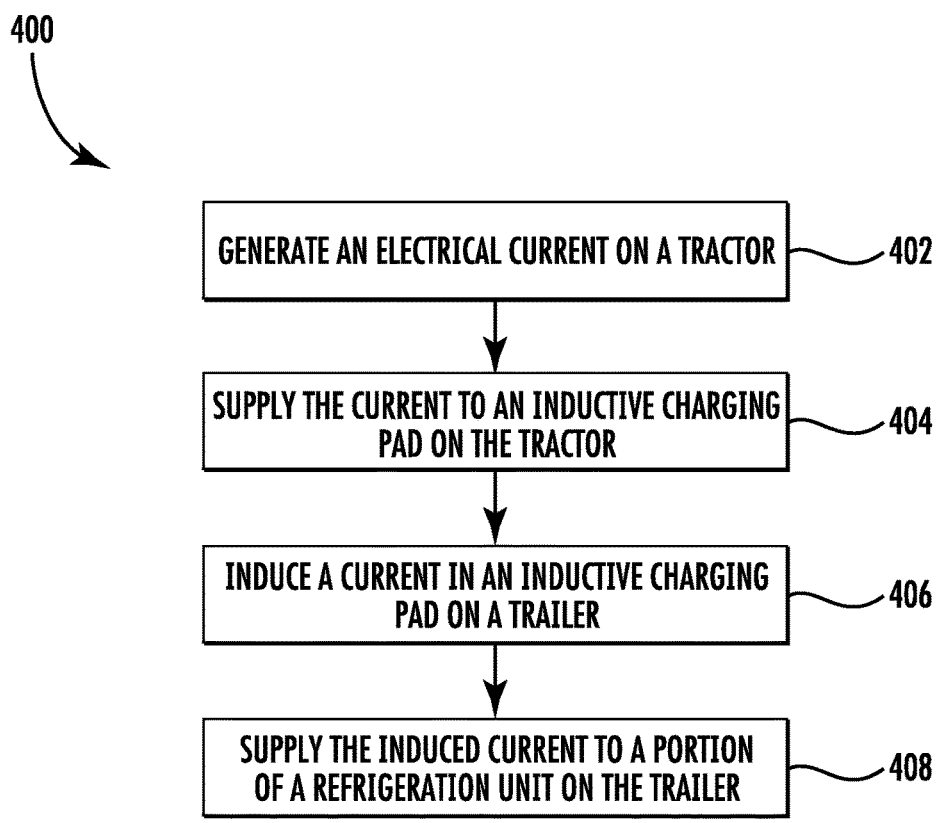
FIG. 4 is a process flow of wirelessly transferring power on a vehicle in accordance with an embodiment of the present disclosure.

Turning now to FIG. 4, a flow process of operation a vehicle having wireless power is shown. Flow process 400 may be employed with the various configurations shown and described above or with alternatives thereof. As a first step, electrical power is generated in the tractor of a tractor trailer configuration at step 402. The electrical power is then supplied to an inductive charging pad on the tractor at step 404. The electrical power is used to induce a current in an inductive charging pad on a trailer of the vehicle at step 406. The induced current is then supplied to a portion of a refrigeration unit on the trailer, such as a battery or components of the refrigeration unit.

Advantageously, embodiments described herein provide for the elimination of cabling and/or a harness between a tractor and a trailer to convey electrical power from the tractor to the trailer. Further, advantageously, systems described herein may enable minimization of the use of a refrigeration unit engine as the fans and compressor (and other components) of the refrigeration unit may be powered using the batteries. Further, in such configurations, because the refrigeration unit engine remains off, fuel savings may result, along with reduced heat input into the refrigeration unit from operation of the refrigeration engine. Further, advantageously, embodiments described herein may enable inductive charging between a tractor and a trailer during operation of the two, and even when the tractor is rotated relative to the trailer.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although shown in two embodiments or configurations, those of skill in the art will appreciate that other configurations may be employed without departing from the scope of the present disclosure. For example, as mentioned, although shown as a complete circle, the inductive charging pads may take other geometries. Further, various types of electrical generators may be used on the tractor. For example, regenerative braking generators, the engine of the tractor, auxiliary generators, etc. may be used to supply electrical current to the second inductive charging pad and thus to be transferred to the trailer.

Accordingly, the present disclosure is not to be seen as limited by the foregoing description, but is only limited by the scope of the appended claims.

What is claimed is:

1. A vehicle having a wireless power system, the vehicle comprising:
   a tractor and a trailer mounted to the tractor, the trailer having a refrigeration unit;
   a first inductive charging pad mounted on the trailer, the first inductive charging pad electrically connected to a portion of the refrigeration unit; and
   a second inductive charging pad mounted on the tractor, the second inductive charging pad electrically connected to a portion of the tractor and configured to induce an electrical current in the first inductive charging pad,
   wherein the first inductive charging pad and the second inductive charging pad are configured such that during relative rotation between the trailer and the tractor, the second charging pad can induce and maintain the electric current in the first inductive charging pad throughout a range of the relative rotation, and
   wherein the electrical current induced in the first inductive charging pad is employed to run the refrigeration unit.

2. The vehicle of claim 1, wherein the first inductive charging pad is mounted on a bottom side of the trailer and the second inductive charging pad is mounted on a frame of the tractor.

3. The vehicle of claim 2, wherein the first inductive charging pad is configured about a king pin on the trailer and the second inductive charging pad is configured about a shoe located on the frame of the tractor.

4. The vehicle of claim 1, wherein the first inductive charging pad is mounted on a frame of the refrigeration unit and the second inductive charging pad is mounted to a cab of the tractor.

5. The vehicle of claim 1, further comprising a generator located on the tractor, the generator configured to supply an electrical current to the second inductive charging pad.

6. The vehicle of claim 1, further comprising a regenerative braking system, the regenerative braking system configured to supply an electrical current to the second inductive charging pad.

7. The vehicle of claim 1, further comprising a battery on the trailer, wherein the electrical current induced in the first inductive charging pad is employed to charge the battery.

8. The vehicle of claim 1, wherein at least one of the first inductive charging pad and the second inductive charging pad is circular.

9. The vehicle of claim 1, wherein at least one of the first inductive charging pad and the second inductive charging pad is arcuate.

10. A method of wirelessly transferring power on a vehicle, the method comprising:
    generating an electrical current on a tractor of the vehicle;
    supplying the electrical current to an inductive charging pad on the tractor;
    inducing an electrical current in an inductive charging pad on a trailer of the vehicle;
    supplying the induced electrical current to a portion of a refrigeration unit on the trailer to run the refrigeration unit; and
    maintaining the induced electrical current in the inductive charging pad on the trailer during relative rotation between the trailer and the tractor.

11. The method of claim 10, wherein the inductive charging pad on the trailer is mounted on a bottom side of the trailer and the inductive charging pad on the tractor is mounted on a frame of the tractor.

12. The method of claim 11, wherein the inductive charging pad on the trailer is configured about a king pin on the trailer and the inductive charging pad on the tractor is configured about a shoe of the tractor.

13. The method of claim 10, wherein the inductive charging pad on the trailer is mounted on a frame of the refrigeration unit and the inductive charging pad on the tractor is mounted to a cab of the tractor.

14. The method of claim 10, wherein generating the electrical current on the tractor comprises regenerative braking of the vehicle.

15. The method of claim 10, wherein the portion of the refrigeration unit that is supplied with the electrical current is a battery.

16. The method of claim 10, wherein the portion of the refrigeration unit that is supplied with the electrical current is a component of the refrigeration unit to be directly operated with the electrical current.

* * * * *